Jan. 2, 1923. 1,440,887
A. F. NESBIT.
ART OF ELECTRICAL PRECIPITATION.
FILED OCT. 11, 1916. 5 SHEETS-SHEET 1

WITNESSES
J. Herbert Bradley.
Horace E. Seitz.

INVENTOR
Arthur F. Nesbit
by W. G. Doolittle
Attorney.

Jan. 2, 1923.

A. F. NESBIT
ART OF ELECTRICAL PRECIPITATION.
FILED OCT. 11, 1916.

A. F. NESBIT.
ART OF ELECTRICAL PRECIPITATION.
FILED OCT. 11, 1916.

WITNESSES
J. Herbert Bradley
Horace G. Seitz

INVENTOR
Arthur F. Nesbit
by W. G. Doolittle
Attorney.

Patented Jan. 2, 1923.

1,440,887

UNITED STATES PATENT OFFICE.

ARTHUR F. NESBIT, OF WILKINSBURG, PENNSYLVANIA.

ART OF ELECTRICAL PRECIPITATION.

Application filed October 11, 1916. Serial No. 125,014.

*To all whom it may concern:*

Be it known that I, ARTHUR F. NESBIT, a citizen of the United States, residing at Wilkinsburg, in the county of Allegheny and State of Pennsylvania, have invented certain new and useful Improvements in the Art of Electrical Precipitation, of which the following is a specification.

My present invention relates to improvements in the art of separating solid and liquid particles from gaseous and fluid streams by electrical precipitation, and more particularly to such improvements as are adapted to provide operation at comparatively high velocities.

Separation of particles from gaseous or liquid streams by electrical precipitation methods involves the formation of an ionization field produced by opposing electrode systems, the fields being produced in various ways, generally being in the form of discharge and collecting electrode between which the field is produced when the electrodes are connected to a source of high potential, the electrodes and the source producing a potential difference between electrodes of the desired amount.

In prior patents and in companion applications, I have disclosed various ways in which such results may be obtained. For instance, the collecting electrode may be in the form of a pipe of circular or other contour with the discharge electrode in the form of a wire or wires or a bar or a built-up structure arranged in or varied from the symmetrical axis of the pipe; or the collecting electrode may be in the form of a rectangular enclosure in which the discharge electrode is in the form of a frame carrying one or more wires or bars or built-up structures, thus producing a zonal effect in the formation of the field. In these arrangements and in others of which I am aware, the practice has been to deliver the stream to the electrode system in such manner that the stream traverses the electrodes either in a horizontal direction or in an upward direction, preferably the latter.

Whether the flow of gas be horizontal or in an upward direction, the direction of flow is angular to the direction of gravity. Where the gas is caused to flow in the upward direction, the natural buoyancy of the gas aids to pass it through the system, in addition to which the travel is in a direction opposite to that which the separated particles would have under gravity, thus more sharply defining the gas and collected particles. Where the direction of gas flow is horizontal, the gas and separated particles also move in different directions but in this form there may be an additional tendency to carry particles forward with the stream, depending on the character of separation. Structures in which this tendency is present require a particular form of collecting electrode in order to produce the field, the result being that while there may be a tendency to produce a scouring action on the collecting electrode (the stream tending to sweep the particles forward after they have reached such electrode) the shape of the electrode is such as to cause the particles to be again carried into a portion of the field of greater density, thus tending to reintroduce the particles into the stream to be again subjected to the ionization effects, thereby increasing the work to be performed.

The electrical energy employed in electrical precipitation methods has generally been pulsating in character as by the use of rectified alternating currents, the apparatus being so arranged that a portion only of the wave is made effective in producing the field, thus apparently producing a somewhat intermittent effect on the field. This would apparently enable the particles to drop under gravitation action, but even under the more favorable conditions, it has been necessary in many cases to provide additional mechanically-operated means for dislodging particles from the collecting electrodes. The intermittent effect of the pulsating current tends to reduce the efficiency of the separating apparatus by necessitating a slower movement of the gas stream through the field. While advantages may result from the pulsating effect, as indicated, disadvantages are present in the loss in efficiency. These disadvantages become more apparent where the precipitation apparatus is to be employed in connection with streams, such as those flowing from blast furnaces in the form of gases, to clean which is a commercial use contemplated by the present invention and in which the conditions are such that efficiency becomes of great importance. For instance, these gases are not only of high temperatures but are of large volume carrying impurities of various kinds. As proper cleaning action without undue loss of heat will partially or wholly eliminate the requirement of re-heating the cleaned gases, the effective use of cleaning systems of this type will greatly reduce the cost of blast furnace apparatus now in general use.

The present invention is designed more particularly to take care of the conditions surrounding such commercial use without a resultant large reduction in temperature, making it possible to reduce the number of down-comers employed and possibly eliminate their use entirely. Consequently, the efficiency of the precipitating apparatus must be high in order that these objects may be obtained.

In meeting these problems, the use of a structure in which the gas flow is upward is unsatisfactory, due to the fact that the particles must agglomerate to an extent sufficient to provide a weight factor greater than the carrying force of the stream. Such agglomeration cannot be controlled either as to amount or position and where the stream contents are of the type forming the gases from blast furnaces, the constancy of the ionization field is maintained with extreme difficulty owing to the tendency of the deposits to build up on the electrodes and thus affect the length of the radial gap between the electrodes, a condition which results in the formation of disruptive discharges and short circuiting of the apparatus. Any scouring action which may occur would tend to move the particles upward unless sufficient weight were present to prevent such movement, and such weight would in itself be sufficient to prevent movements due to scouring. High velocities of the stream would increase these results since the carrying force of the stream increases correspondingly, a condition which would increase the scouring action but at the same time decrease the possibility of the particles agglomerating to produce the weight factor required to overcome the increase in force. Hence this particular type of apparatus is limited as to velocities, especially if employed for blast furnace work.

To attempt to meet the problem by stream flow in a direction transverse to gravitation (horizontally) is also unsatisfactory, especially under high velocity conditions. If sufficient velocity to produce a scouring action is present, the stream carrying force will tend to carry the particles onward until sufficient agglomeration is present to produce a weight factor sufficient to permit the particles to gravitate independently of the carrying force. In addition, such structures embody successive fields, so that the particles are simply transferred from one field to the next if the carrying force be materially increased. Where the fields are somewhat individualized by varying the collecting electrode from a plane surface, this effect is increased in that the particles are again thrown into a denser portion of the field during such transfer.

Neither type is suitable to meet the conditions of high velocities such as must be employed in blast furnace work and other large capacity operations. The velocities must be limited and this necessitates a large increase in apparatus and cost of operation, in addition to which the question of decreasing heat losses becomes a serious problem.

I have discovered that there need be no difference in the direction of flow of gas and of the particles; that the field alone, or the combined action of the field and centrifugal force, will provide proper separating action, eliminating the necessity of agglomerating particles to provide a weight factor. With this discovery high velocities become of advantage in that the scouring action produced thereby may be applied as an aid in carrying the particles toward the exit without causing them to re-enter the field. This enables the use of pocket structures to receive the particles, an arrangement which is pointed out in companion applications.

I have found that it is possible to employ velocities in excess of fifty feet per second, thereby securing action which need not be augmented by mechanical "knockers" for loosening the collected particles. The limitations as to velocities in prior structures are well known. Since there is no material requirement of agglomerating the particles, the tendency of the formation of disruptive discharges is greatly reduced.

While this change in direction of flow is of positive advantage where the prior forms of electrical energy are employed, it becomes of greater value where the intermittent effect referred to is materially reduced if not entirely eliminated, a result obtainable by the use of substantially continuous unidirectional electrical energy, one form of which is provided in the Girvin type of generator. Where electrical energy of this type is employed, the rate of flow of the gases through the field may be materially increased. Nor is the invention intended to be limited to any particular form of electrical energy, since it may be employed with those forms heretofore employed for the purpose as well as the particular type referred to.

Another feature of the present invention is the use of the combined action of centrifugal force and the ionization field. The gases are introduced into the field in the form of streams delivered in such manner as to cause each stream to move around the discharge electrode in a spiral path toward the exit. This movement is at high speed, thus bringing centrifugal force into action on the stream contents. The spiral whirling movement is produced mechanically in advance of the entry of the stream into the field, the result being that the particles are not only thrown toward the collecting electrode with great force due to the combined effects, but the movements aid in producing the scouring effect, especially under the high velocities contemplated by the present invention.

This spiral or whirling motion has the additional advantage of retaining the gases within the field a sufficient length of time without increasing the length of the field; in practice, it has been found that while the speed is greatly increased, the length of the field may be greatly decreased due to the fact that the cleaning action is completed with much greater rapidity. The increase in velocity decreases the amount of apparatus required to meet predetermined conditions, while the decrease in field length renders such apparatus more compact in form.

Another feature is that of initially ionizing the particles of the stream contents. This is produced by carrying the gases in stream paths, the walls of which form a portion of the discharge electrode system. The particles thus become charged with the same sign as that of the discharge electrode, thereby providing the usual repelling action between particle and electrode. This not only tends to reduce liability of deposits on the discharge electrode, but also aids in more quickly carrying the particles to the stream boundary, thus ensuring rapid cleaning of the gases.

To these and other ends, the nature of which will be readily understood as the invention is hereinafter disclosed, my invention consists in the improved methods, together with the improved construction and arrangement of parts, hereinafter fully described, illustrated in the accompanying drawings, and more particularly pointed out in the appended claims.

In the accompanying drawings, in which similar reference characters indicate similar parts in each of the views.

Figs. 5ª and 6ª are fragmentary diagrammatic views taken on horizontal sections.

Fig. 19ª is a perspective detail of one form of head which may be employed with the structure of Fig. 19.

Structures adapted for use in the separation of particles from fluid or gaseous streams generally include opposing electrode systems connected up to a source of electrical energy, the systems being so arranged as to provide a flow path for the stream between electrodes of opposing sign, the flow path forming a field within the circuit and within which the ionization effects are produced. The opposing electrodes are generally termed the discharge and the collecting electrodes, and where a plurality of fields are provided, the discharge electrodes are connected electrically; as the collecting electrodes are generally connected to ground (although they may form a part of an electric circuit), it is sufficient to connect the several collecting electrodes of a system to provide a grounding effect. Obviously, the opposing electrodes vary widely as to potential, and it is desirable that the discharge from one to the other be maintained slightly below the disruptive discharge point, a condition where maximum efficiency is generally had. The source of electrical energy is of sufficiently high potential to provide this discharge action, and is of suitable character. For instance, one form heretofore provided is that of rectified alternating currents which are arranged to provide a pulsating action. Oscillating currents may also be employed but it is preferred to use the unindirectional type in order that the polarity of the electrodes may be maintained. While the pulsating rectified currents have generally been employed, I prefer to employ apparatus of the Girvin type wherein the current is not only unidirectional, but substantially continuous, thereby permitting of greater velocity in the flowing streams and a resultant increase in capacity of the apparatus.

The discharge and collecting electrodes may be of various forms. I may, for instance, provide the collecting electrode system in the form of one or more tubular members, the discharge electrode extending into or through the member either in the symmetrical axis of the tubular member or varied from such axis, depending upon the particular type of apparatus and the work to be performed. Such arrangement, whereby the discharge electrode is in the form of a single wire, provides practically a continuous uninterrupted field from end to end of the tubular member, the corona type of discharge being preferably employed. I may, however, form the discharge electrode with an edge arranged spirally about the electrode, each spiral convolution thus providing a separate discharge zone, the field thus having a spiral zone effect. This effect may be increased by employing several spirals, in which case, each spiral forms a continuous zone from one end of the electrode to the other, separate zones being produced by the separate spirals. In either case, a longitudinal section of the field would practically place a succession of zones on the line of section. I have also formed the discharge electrode with discharge edges arranged circularly about the electrode, each zone thus being continuous within its own plane, the field being formed of a succession of such zones. As will be readily understood, the two electrodes form a unit in which the action is individual to itself, the gases traveling in the direction of length of the tube. These particular forms are especially adapted for use with tubular collecting electrodes, the capacity of the apparatus being produced by the employment of a plurality of such units. The units may be arranged in any desired grouping, as for instance, circular, cylindrical or rectangular series, or combinations thereof.

Figures 6, 7, 8, 9, 10:
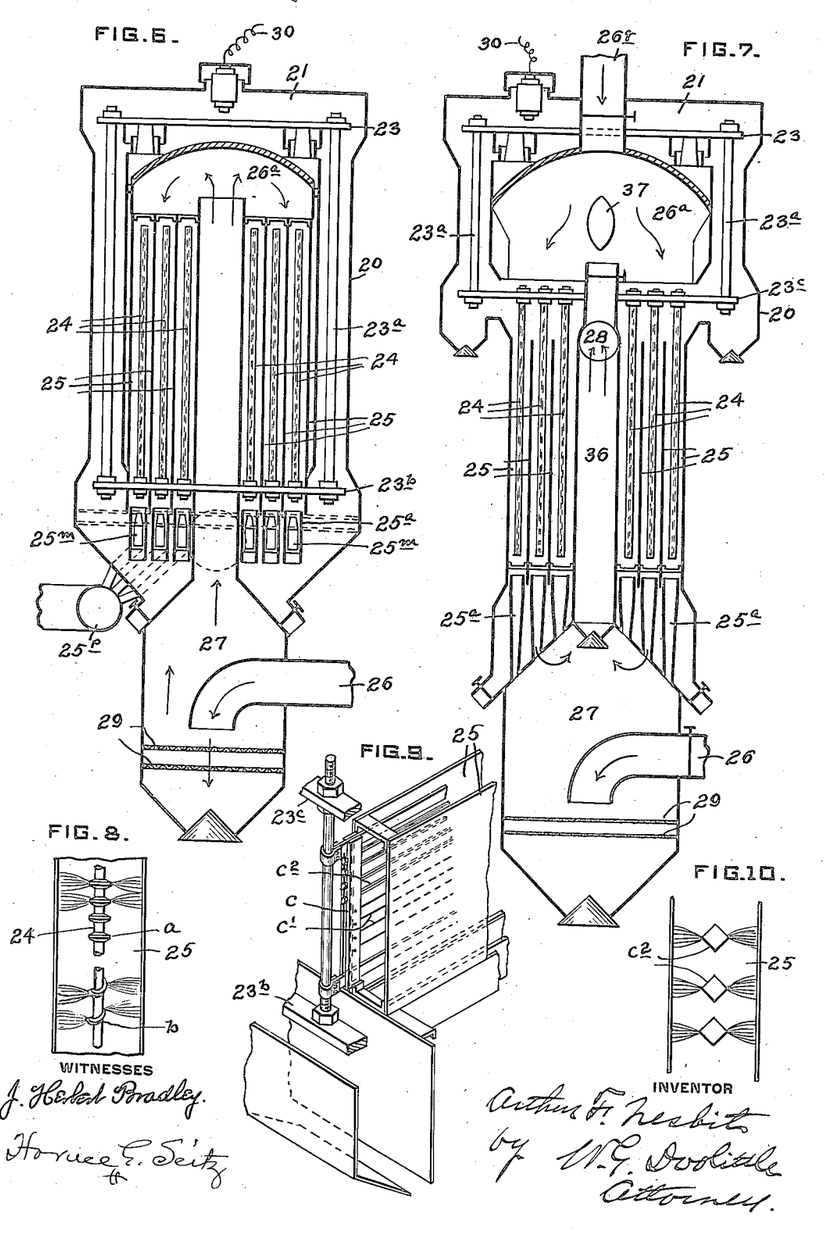
Figs. 8, 9 and 10, are fragmentary views showing various types of electrodes adapted for use in the opposing electrode systems contemplated by the present invention.

Another form in which these systems may be provided is by arranging the collecting electrodes in the form of rectangular compartments, in which the opposing walls which form the collecting surfaces are substantially parallel, an arrangement disclosed more particularly in Figs. 6, 6ᵃ and 9. In this type, I prefer to provide the discharge electrode in the form of a plurality of parallel discharge elements, preferably carried by a frame, the elements preferably having their direction of length intersecting the direction of flow path length. The elements of the discharge electrode may be in the form of wires or bars, the latter preferably having discharge edges facing the collecting electrodes, this general arrangement also causing the field to be made up of a plurality of discharge zones. As will be clear, such arrangement also provides the unit feature and in such manner that a plurality of units can be readily combined to provide the desired capacity.

In the drawings I have shown various ways of forming the discharge electrode system, these forms being disclosed and claimed in companion applications, the present invention pertaining more particularly to the general arrangement of the apparatus.

Figure 1:
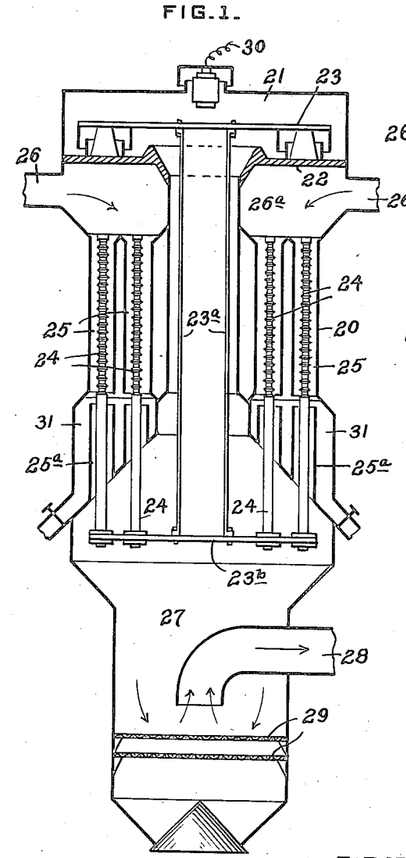
Fig. 1 is a diagrammatic view in vertical section of one arrangement of apparatus embodying various features of my present invention.

Fig. 1 shows one way in which the present invention may be embodied, the view being diagrammatic to indicate the general arrangement, the view being representative of either a circular arrangement with the collecting electrodes in the form of tubes (in which case the view may be considered as on the order of a section taken diametrically through the apparatus) or the apparatus may be elongated or rectangular in contour, (in which case, the collecting electrodes may be considered as forming rectangular compartments). In this view, 20 indicates a casing having an insulating chamber 21 at its top, a suitable partition 22 acting as a support for the insulators, etc., the latter carrying the discharge electrode system, this system including supporting members 23 of proper form from which supports 23ᵃ depend, the lower ends of support 23ᵃ carrying members 23ᵇ which may be in the form of a spider or frame, these members 23ᵇ carrying the discharge electrodes 24 which extend upwardly into and substantially through the compartments formed by the collecting electrodes 25. The particular showing in the drawing is that of collecting electrodes in the form of tubes, the discharge electrodes being in the form of rods formed with circular edges, thus forming fields composed of individual ionization zones arranged in the path of travel of the gases. Obviously, the discharge electrodes may be of any of the other types adapted for use in the tubular system. In case the collecting electrodes are in the form of rectangular compartments, the discharge electrodes 24 are preferably of the type in which a plurality of electrodes are carried by a rectangular frame.

In this form of apparatus, the collecting electrodes are preferably supported at their upper ends, the weight of these structures being such as to reduce vibration effects to a minimum.

In the embodiment of the invention shown in Fig. 1, the gas enters through one or more inlets 26 arranged above the upper ends of the collecting electrodes and below partition 22, the space between said partition and the tops of the electrodes forming a chamber 26ᵃ from which the gases pass into the several fields provided by the opposing electrode systems. The gas passed downward through the field is discharged into a discharge chamber 27 below the electrodes, passing outward through gas outlet 28, said outlet 28 having its inlet end preferably arranged to cause the gases within the chamber 27 to move downwardly and then upwardly into the outlet, thus tending to bring the gases within the influence of suitable screens 29 which may serve to restrict the carrying of particles into the gas outlet should such particles remain in the gases after passing through the field. As shown, the supports 23ª extend downwardly through a central opening of the apparatus, this opening or passageway connecting the insulating chamber 21 and discharge chamber 27, the walls of the opening being sufficiently spaced from the supports and properly formed to reduce liability of short circuiting action between the supports and walls, it being understood that the supports form part of the discharge electrode system, while the walls of the opening or passageway practically are part of the collecting electrode system, supporting members 23 being connected to a source of high potential represented by conductor 30. While the opening or passage way for the supports 23ª connects discharge chamber 27 with insulating chamber 21, it will be readily understood that the general course of the gases will not carry them into the insulating chamber 21 to any material extent, due to the fact that this chamber and the connecting passageway are practically closed for circulation purposes. Where the apparatus is of a rectangular form, the supports 23ª would preferably be located adjacent the ends of the opening, the latter having a proper cross sectional configuration to produce the desired result.

In the form shown in Fig. 1, the collecting electrode structure is practically in two parts, the upper portion being that provided to cooperate with the discharge electrodes in producing the separating field, while the lower part, indicated at 25ª, is substantially axially aligned with the main portion, but spaced therefrom to a more or less extent, depending upon the character of work to be performed, the purpose being to provide a passageway between the two portions through which the separated particles may readily pass, the particles (which move toward the collecting electrodes) passing downwardly and being thrown outwardly under the action of the fields, the restraint provided by the walls of the collecting electrodes being removed through the presence of these passageways. This result is aided by slightly flaring the lower ends of electrodes 25. As a result, the separated particles will be thrown outward into the deposit chamber 31, from which they are readily removable, while the gases will continue downward into discharge chamber 27. As deposit chamber 31 is practically a "dead" chamber for gas circulation purposes, effective separation is provided.

The general arrangement described is such that a sufficient number of units can be provided to take care of a large volume of gases, as for instance, the gases from a blast furnace, each unit, however, producing a complete ionization field capable of providing the separating action and carrying the particles toward and generally into contact with the collecting electrodes, and hence out of the main portion of the flow path of the gases.

While this is the general action of the later developments in this art, and will operate efficiently where the gases travel in a path opposing gravity (an operation in which any tendency of the particles to re-enter the stream will carry the particles into the denser portions of the ionization field and again subject them to the action of the discharge), a different action will result where the direction of flow of the gases is reversed, so as to coincide with the direction of travel of the particles under gravitation. While such change in direction of flow would not be prevented by the action within the ionization field, a serious difficulty is encountered as the streams and particles leave the field owing to the fact that the particles are free to re-enter the gases after having passed through ionization field and at a point where further separating action is not had. In order, therefore, that the gases may be permitted to travel downwardly—in the direction of gravity—in passing through the field, provision must be made for maintaining the separation provided by the field after the gases and particles have left the field. This result is obtained in the structure of Fig. 1 by eliminating the restraining influence of the collecting electrode at one or more points in the field or at the discharge end of the field, thus permitting the particles to move outwardly beyond the boundaries of the part of the gas flow path below such point, this outward movement being due to the effect produced by the electrical phenomena operative within the field and which is effective at such point. As a result, the field not only acts to separate the particles from the stream, although both travel in the same direction, but maintains the separation by carrying the particles beyond and out of contact with the flowing gases.

As will be readily understood, this particular arrangement is not restricted to use with downwardly flowing gases, but is equally effective where the gases travel upwardly or in a direction reverse to the action of gravity, the electrode action at the point where this restraint against outward flow of particles is removed being the same in either case, the particles moving outward at such point as they travel along the wall or walls of the collecting electrode, being discharged outwardly when the opening is reached. However, the downward flow of the gases, made possible by this ability to maintain the separation, is preferable, for the reason that the gases thus provide a scouring action on the collecting electrode in a direction to aid gravity and thus more rapidly place the particles away from liability of returning to the stream and at the same time reduce the tendency to build up particle deposits on the collecting electrode in a manner which may tend to provide disruptive discharge conditions. By tending to reduce the latter action, material advantage is had in that short circuiting of the apparatus takes place at less frequent intervals if not entirely eliminated.

By practically forcing a change in direction of the gas flow after leaving the fields, larger particles which might be carried along with the stream, due to the velocity of the latter and gravity, would be separated by reason of this change, the particles being less likely to move in opposition to gravity after entering the discharge chamber, especially if the gas flow is such as to carry it below the screen structure indicated at 29.

Figure 2:
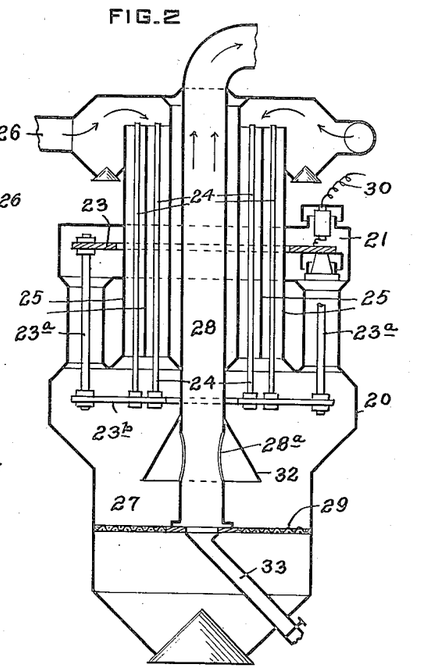
Figs. 2–7 are similar views indicating various combinations and modifications which embody features of the invention.

The effect of omitting means for maintaining the separated condition of gas and particles is shown to some extent in the construction of Fig. 2 which, in addition to providing various other changes in construction, omits this particular feature. As will be seen, the particles are dropped into the space which receives the gas, and thus may practically re-enter the gas after it has left the field. In this particular form, some dependence for meeting this objection is provided by the tendency of the particles to agglomerate on the collecting electrode, this effect combined with the forcible change in direction of gas flow so as to practically compel the gas to pass through the screen structure, tends to provide a separating action, the agglomerated particles, made heavier by reason of such agglomeration, being less likely to move upward into the gas outlet, owing to increased weight and the screen action. This effect is enhanced to some extent by reason of the fact that the gas velocity is decreased in entering the larger chamber below the electrodes, thus enabling the weight of the agglomerated particles to be of increased effectiveness in providing the separating action.

In addition to these differences, the general construction is varied to some extent, tending to provide for compactness. In this arrangement, the insulating chamber 21 is located below the gas inlet structure 26, the upper ends of the collecting electrodes being located adjacent the top of the structure, the gas inlet chamber being provided with suitable discharge openings normally closed by valves or other suitable structures, by means of which heavier particles which may drop on reaching the chamber can be readily removed. In this form, the supports 23ª extend downward from supporting members 23 outside of the electrode systems instead of centrally as in Fig. 1, the lower ends of these members carrying the spider 23ᵇ from which the discharge electrodes 24 extend vertically. The supports 23ª preferably extend through tubular members and may be formed to produce, with such members, ionization fields, in which case the radial distance between the discharge edge and the tubular members, will be greater than the similar length of the fields between the main electrode systems, thus reducing liability of the structure to short circuit at these points, while tending to reduce the possibility of particles reaching the insulating chamber.

In this particular form, the gas outlet extends vertically centrally of the apparatus, the outlet member 28 having openings 28ª for the entrance of the gases, a shield structure 32 preferably extending over these openings, thus forcing the gas to travel the desired distance below these openings before reversing its direction of travel to reach the outlet. In this view, the bottom of the gas outlet is shown as provided with a receptacle in which particles that might be carried into the outlet may drop, thus tending to prevent any material collection of particles at the bottom of this tube, this particle discharge outlet being indicated at 33.

This particular arrangement may involve either of the several types of electrode construction, being adapted to be employed where the collecting electrodes are tubular or are in the form of rectangular compartments, the proper complemental form of discharge electrode structure being employed. Similarly, the collecting electrodes may be supported either at their tops or at their bottoms, the drawing showing them supported at the bottom to indicate such possibility.

Figure 3:
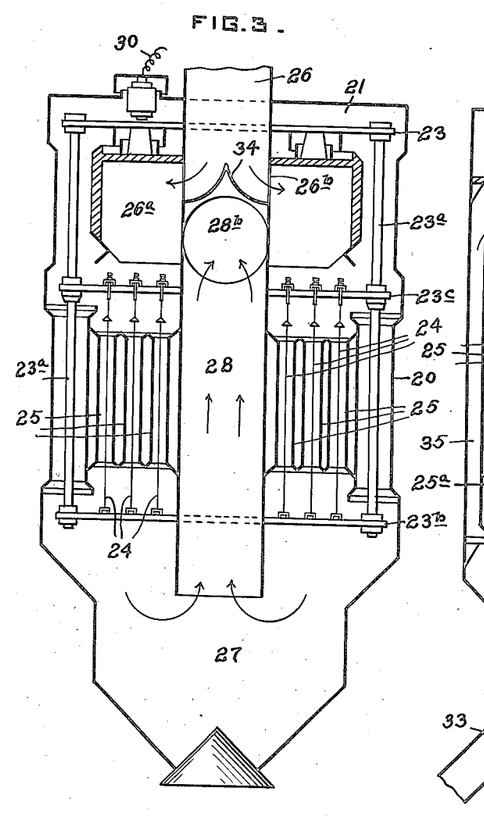

Fig. 3 discloses another modified form, the insulating chamber 21 being located at the top, as in Fig. 1, the supports 23ª, however, extending downward through tubular members as in Fig. 2, the view showing the use of an upper spider 23ᶜ above the collecting electrodes in addition to spider 23ᵇ, thus indicating a form of structure in which the discharge electrodes may be in the form of wires extending through and in the symmetrical axes of the collecting electrodes, suitable means being provided for maintaining the wires taut. In this form, the extensions 25ª to the collecting electrodes are also omitted, although they may obviously be provided, if desired. The gas inlet and outlet are shown as axially aligned, being separated in suitable manner as by a separating member 34 which may have a form to direct the incoming gases outwardly through openings 26ᵇ above member 34, thus introducing the gas into the open-bottom chamber 26ª above the inlet ends of the collecting electrodes. The gas outlet tubular member extends below the bottom of the collecting electrodes and is formed with an open bottom through which the gases enter from chamber 27 flowing upwardly through such tube and escaping through the opening or openings 28$^b$ below member 34.

This structure may also be in either type, (the lateral type shown in Fig. 1 or lateral inlet and vertical outlet type of Fig. 2,) the proper complemental discharge electrode system being employed. Similarly, anyone of the forms of extensions 25$^a$ and discharge chamber may be employed with this general form, if desired.

In each of Figs. 1, 2 and 3, the gas not only flows downwardly through the ionization fields but has its inlet entirely above the top of collecting electrodes, the gas outlet being located below the electrodes as in Fig. 1, or extending upwardly as in Figs. 2 and 3. In the latter constructions there is a tendency to maintain the temperatures of the gas, since the out-flowing gas conduit extends through the portion of the apparatus containing the electrode system, thereby permitting the heat of the gas to be somewhat effective in heating the parts of the apparatus to decrease loss of heat through radiation. This feature may be increased by placing the gas inlet below the electrodes and carrying it to the top of the electrode system before entering the fields, this being made possible by the use of suitable passageways, after which the gas passes downwardly through the ionization fields and then upwardly into and through the gas outlet.

Figure 4:
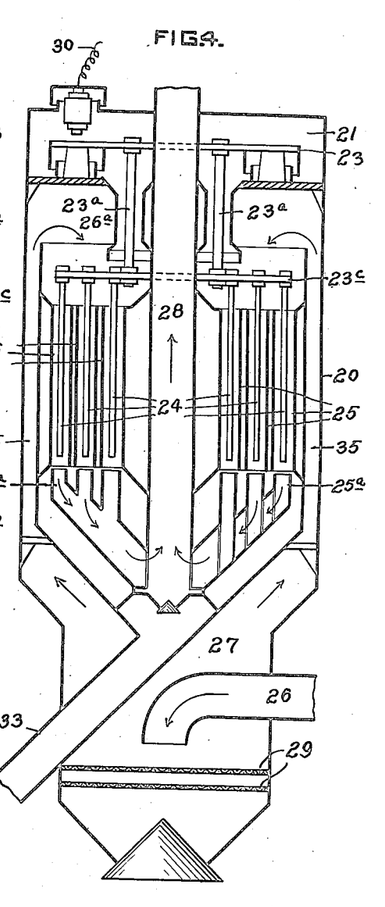

An apparatus of this latter type is shown diagrammatically in Fig. 4, in which the gas is introduced at the bottom of the apparatus and is discharged at the top, its flow path, however, carrying it through ionization fields in a downwardly direction. This flow path is secured by connecting chambers 25$^a$ and 27 external of the electrode structures in any suitable manner, as by conduits 35, chamber 27 in this form acting as a receiving chamber for the gas instead of a discharge chamber. In this form, the independent deposit chamber is preferably of a slightly different type, the general idea of Fig. 1 with respect to the collecting electrodes being employed, the extensions 25$^a$ being of different lengths, the walls being arranged in such manner as to deliver the clean gas to the vertical outlet or off-take 28 through openings or passageways 28$^a$, thus carrying the gas upwardly through the electrode zone.

This particular form is also applicable for use either in the cylindrical or rectangular form, the discharge electrode preferably depending from spider 23$^c$, the latter having its supports 23$^a$ extending through passageways outside of off-take 28, these passageways being shown in a different location from those of Figs. 1 and 2.

The arrangement of the collecting electrodes and the extensions 25$^a$ in this view differs to some extent from that of Fig. 1 in that dependence is placed more upon the axial aligning of the parts so that sufficient space is provided to permit the particles to drop by gravity outside of the extensions, the arrangement indicating a structure which may be employed where the discharge electrodes do not reach the lower ends of the collecting electrodes, although, as indicated in Fig. 6 it may be employed under certain conditions with the discharge electrode support located at the bottom of the electrodes.

Figures 5, 5A, 6A:
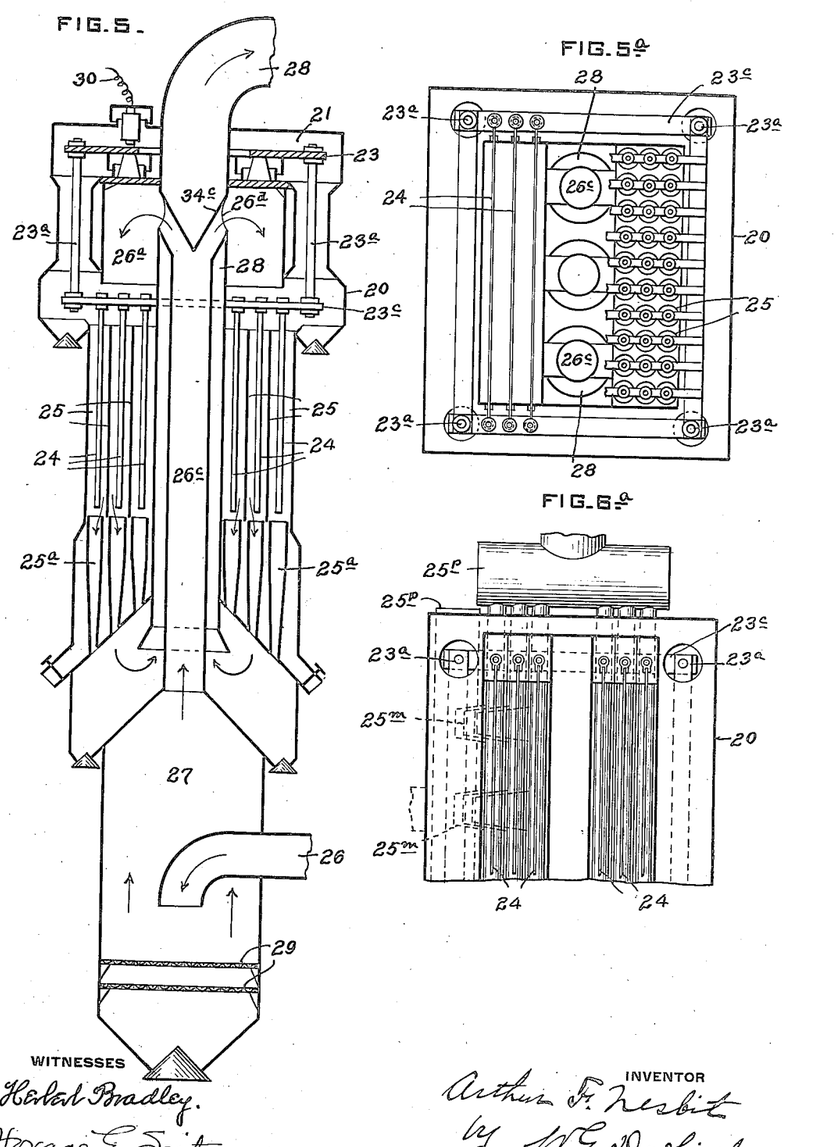

Fig. 5 discloses a different way of combining the various features. For instance, the gas is introduced at the bottom of the apparatus, as in Fig. 4, but passes upwardly centrally of the apparatus instead of externally, the passageway (26$^c$) being located within the outlet 28, and leads outwardly into chamber 26$^a$ through one or more passageways 26$^d$ which may be formed in part by a separating member 34$^c$. The discharge electrodes depend from spider 23$^c$ as in Fig. 4, but the supports are located externally as in Figs. 2 and 3, the insulating chamber being located at the top as in Fig. 3. The extensions 25$^a$ are slightly different from those of Fig. 1, the deposit chamber, however, being along the lines of Fig. 1. The gas outlet is open at its bottom as in Fig. 3, but is preferably flared. The circulation of the gas is indicated by the arrows. This form may also be of either the cylindrical or rectangular type or a combination of both types.

Fig. 5$^a$, which may be considered as a horizontal section through the structure of Fig. 5, indicates the possibilities of combining the various types in one apparatus, as well as showing various arrangements which may be employed individually. In this view, the portion to the left of the off-take passageways has the rectangular form of collecting electrodes with corresponding arrangement of discharge electrodes. The structure on the right of the off-take indicates one way in which a plurality of tubular collecting electrodes may be arranged, this being a possibility where the apparatus is rectangular in form. This particular view will also indicate, to some extent, the difference in cross sectional area of the stream flow path by comparing the rectangular and tubular forms of collecting electrodes.

Figs. 6 and 6$^a$ show a further modification, these disclosing the structure in rectangular form; it is obvious, however, that the same general idea may be employed in the cylindrical type. In these views, the gas enters at the bottom as in Fig. 5, passing upwardly and discharging into chamber 26$^a$ from which it passes into the ionization fields. In this form, the extensions 25ª have openings 25ᵐ at their ends or in the bottoms or at both points, these openings leading to drums 25ᵖ either at the ends or the sides of the apparatus or at both points. The discharge electrodes preferably are supported at the bottom, the supports extending through tubular passageways. The extensions 25ª are shown as extending into the lower portion of the collecting electrode structures, suitable spaces being provided between the opposing walls to permit the particles to pass through into the deposit chamber while the gas passes through the extensions.

Fig. 7 discloses a structure along the lines of a combination of the structures of Figs. 3 and 5 but arranged to be reversible, thus permitting the gas to flow either up or down through the ionization fields. To produce this result, the apparatus is provided with two gas outlets, both valve controlled, one inlet, indicated at 26, being similar to the inlet of Fig. 5, the other inlet, indicated at 26ᵍ, being at the top of the apparatus, opening into chamber 26ª. The gas outlet 28 is connected to the central passageway 36, said passageway having its opposite ends opening into chamber 26ª and discharge chamber 27, both ends being valve controlled. A removable deflector 37 is preferably positionable in chamber 26ª.

When it is desired that the gas flow downwardly through the fields, inlet 26ᵍ is opened, inlet 26 closed, the upper end of passageway 36 closed and the lower end of said passageway opened. This arrangement causes the gas to pass downwardly through the fields and upwardly in passageway 36, leaving said passageway through the said gas outlet 28. If it is desired to pass the gas upwardly through the fields, the valves are reversed, inlet 26ᵍ being closed, deflector 37 removed, inlet 26 opened, the lower end of passageway 36 closed and its upper end opened. The gas then enters through inlet 26, passes upwardly through the fields and downwardly in passageways 36 to the gas outlet.

The several structures shown each embody the general features of subjecting the stream to the ionization action in such manner as to move the particles toward the collecting electrodes to carry them to the outer sides of the stream, and then aid gravity in the removal of the particles by the sweeping or scouring action produced through carrying the gases in the direction of gravity. The specific structures so far described vary in different respects and indicate the general possibilities in constructing apparatus to meet individual conditions, it being understood that various other forms may be provided differing to a more or less extent from those indicated, but all embodying one or more of the general features. In addition, various ways of producing the segregation of the separated particles are shown, these ways being representative in character and operating in different manners.

Various forms of discharge electrodes are shown in the drawings. In Fig. 3, I disclose the idea of the use of a vertically extending wire mounted in the symmetrical axis of a tubular collecting electrode, these opposing electrodes being connected to a source of electrical energy of high potential, or to such source and the ground, the electrodes being at the desired difference of potential. In practice, the potential is substantially maintained at a point sufficiently below that required to produce a disruptive discharge across the radial gap between the electrodes, such arrangement tending to produce the corona type of discharge from the discharge electrode. In Fig. 8 I show other forms of discharge electrodes which can be employed with a tubular collecting electrode, the discharge electrodes in these forms permitting the use of pipes of considerably larger diameter, the electrodes being formed with edges arranged circularly, as at $a$, or spirally, as at $b$, these edges being formed in suitable manner. For instance, the edges $a$ may be machined on a bar or each edge may be an individual unit, a plurality of units being assembled in axial alignment on a supporting bar, thus building up an electrode having circular zones. The edges $b$ may also be formed by a machining operation or may be produced by the twisting of a bar of angular cross section, the latter being more particularly disclosed in a companion application. These several forms are adapted for use in tubular structures of circular cross sectional contour, the discharge electrode extending axially through the tube. Where the collecting electrode structure is of rectangular form, I prefer to employ a discharge electrode of a different type, in that a plurality of elements are rigidly mounted within a frame structure in parallel arrangement, the frame and electrode elements as an entirety, forming the discharge electrode, the frame preferably being so formed as to provide no material discharge action although it is connected in the electrode circuit. A structure of this general type is shown in Fig. 9 in which $c$ indicates a frame, $c'$ indicating the electrode element as in the form of a wire strand stretched across the frame, $c^2$ indicating the element in the form of a bar having edges opposing the collecting electrode. Obviously, the electrode elements are of similar sign and produce zonal effects in the field similar to those of the edges $a$ in Fig. 8, the zones intersecting the direction of flow of the gases at substantially right angles, thus subjecting the stream to the action of a plurality of zones in traversing the ionization field. Fig. 9 indicates one way in which this construction may be built up in connection with collecting electrode structures in the form of plates mounted on suitable bars and properly spaced, the view showing a fragmentary portion of structure when this type of electrode is employed.

Fig. 10 is a diagrammatic view of both types of discharge electrodes and indicates not only the zonal effect produced, but also the fact that such structures are adapted for either upwardly or downwardly flowing gases. The views herein disclosed are mainly diagrammatic to indicate the general form of construction. Obviously, the particular structural conditions may necessitate variations, or various minor structural changes in producing the apparatus. Each of the forms disclosed, however, or modifications thereof embodying the general ideas, are capable of ready manufacture and assembly.

As heretofore indicated, additional advantageous effects can be obtained by combining with the separating action of the ionizing fields a mechanical action on the gases which serves to place the gases within the fields into motion in spiral directions, tending to set up a centrifugal effect. Where this action is employed, the collecting electrodes are preferably circular in contour. In producing this effect, the gases are passed into the tubes through structures which divide up the gas into smaller streams and which provide passageways for these streams, each passageway being arranged to change the direction of flow of the stream so that as the stream is emerging from the outlet end of the passageway its direction of flow has been changed from a direction corresponding to a longitudinal plane of the tube to a direction which is inclined to such plane. Consequently, the stream traverses the field in a spiral direction, thus not only increasing the time-length of flow through the field but at the same time producing a centrifugal effect on the stream contents, thereby aiding in more rapidly collecting the particles on the collecting electrode. While the effect of the field is to drive the particles toward the collecting electrode, the motion of the particles may be more or less affected by this centrifugal action, which aids in more rapidly clearing the gas by the removal of the particles.

As will be readily understood, the increase in rapidity of the removal of particles to the boundaries of the stream (the collecting electrode) will clear the gas in a shorter length of time, thus enabling the length of the field to be materially reduced since there is no necessity for confining the gases within the field after they have become cleaned. However, a more positive advantage is obtained through the fact that the streams can be carried through the field at a greatly increased speed, the length of the field being sufficient to insure the proper separation even though the gases are traveling at high velocity. By increasing the speed, the centrifugal action will obviously be increased as will the scouring effect on the collecting electrode. Hence, the length of the field may not only be materially decreased from that heretofore considered necessary, but in addition, the capacity of the apparatus is largely increased through the increase in speed. Experiments have demonstrated that the speed may be increased many times that heretofore believed to be the limit in commercial practice. For instance, instead of eight to ten foot per second travel of the gases, the gas can be forced or drawn through the apparatus at a speed in excess of fifty feet per second. Obviously, the capacity of apparatus of the latter type is greatly increased over prior structures, so that the cost of apparatus to meet certain definite conditions is greatly reduced where the installation is of this combined type.

Another advantage in the arrangement of this type is the fact that the devices which are employed for producing the spiral flow of gases may form part of the active or discharge electrode system, so that the stream contents pass through such devices in reaching the field, thus making the field action more rapid in effect and at the same time tending to maintain the discharge electrode clean, it being readily understood that particles having the same sign of charge as the discharge electrode will be repelled by the latter. The gases are, therefore, not only more rapidly cleaned, but, in addition, the necessity for a particular design of active electrode to eliminate particle collection thereon is greatly reduced.

Figures 11, 12, 12A, 13, 14, 15:
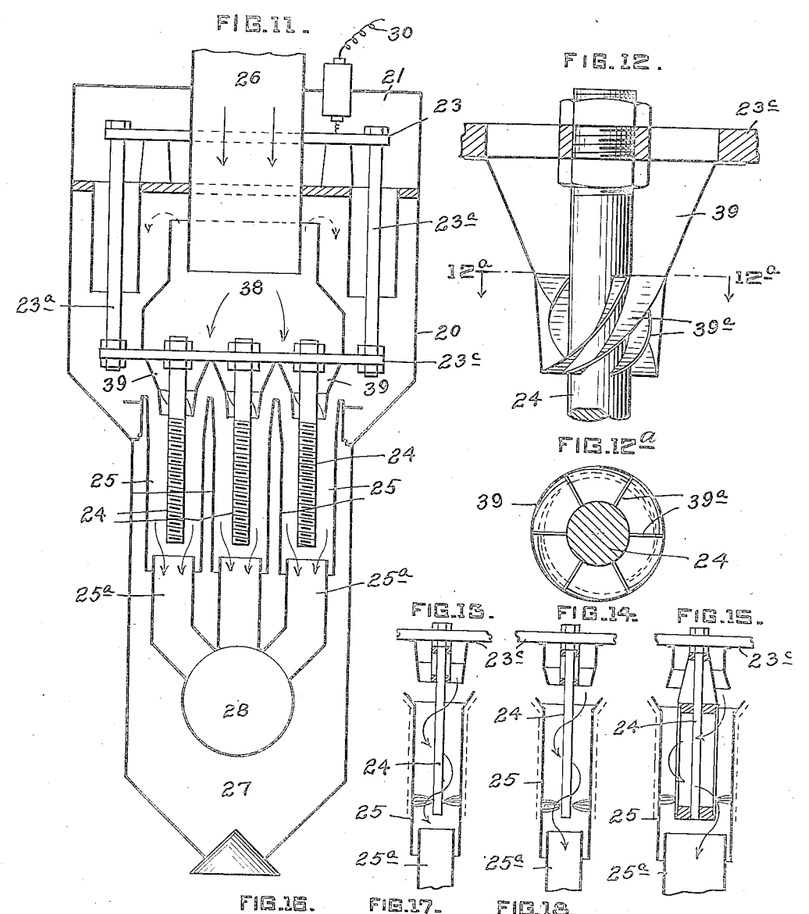
Fig. 11 is a diagrammatic view in vertical section of an arrangement of apparatus adapted to provide centrifugal motion to the gases.
Figs. 12 and 12ª are detail views showing parts of Fig. 11, Fig. 12 being partly in vertical section and partly in elevation, Fig. 12ª being a sectional view on line 12ª—12ª of Fig. 12.
Figs. 13–17 are diagrammatic views of various modifications of the general idea of Fig. 11.

One way in which this general idea can be carried into effect is shown in Fig. 11 in which the gas inlet is shown as opening into a chamber 38, the walls of which are spaced from the walls of the inlet. The walls of chamber 38 preferably flare outwardly to extend over an area which will permit free entry of the gases into individual direction-imparting members 39, one of such members—which may be considered as heads—being provided for each ionization field. In this form, the walls of chamber 38 and members 39 may be carried by the spider which supports the individual discharge electrodes.

As shown more particularly in Figs. 12 and 12$^a$, each device 39 has the general characteristics of a funnel, in that the upper portion is flared outwardly toward the top, the lower portion being contracted to a more or less extent, the device surrounding the stem of the discharge electrode, the latter passing axially therethrough. The contracted portion of the device is provided with a plurality of vanes 39ª which act to divide this contracted portion into a plurality of passageways. Each vane is curved in its direction of length in such manner that the direction of flow of the gases shifts from a direction corresponding strictly with the direction of length of the electrode to a direction more or less transverse to the electrode direction of length, thus tending to discharge the gases from the heads in the form of a plurality of streams each issuing in a direction which tends to produce a spiral movement of the gases within the field toward the gas exit.

Since the heads are supported by an element of the discharge electrode system, each head must be properly arranged with respect to the collecting electrodes which form part of the grounded system. In this particular form, this relation is obtained by flaring the upper end of the collecting electrodes, a structure which does not affect the ionization field even though the zone-producing edges may extend above the meeting line of the flared and straight portions of the collecting electrode.

This form also contemplates the provision of separating the collected particles from the gases by the use of equivalents of extensions 25ª, these extensions in this case leading to an outlet common to all of the extensions.

As will be seen, the discharge electrodes are comparatively short in length, thus restricting the length of the ionization field. The gases are given a spiral direction of flow through the action of heads 39, so that the walls of the collecting electrode will be continuously swept by these gases traveling at comparatively high speeds, and thus tend to produce centrifugal action on the stream contents as well as its resultant on the particles which have been collected on the electrode and not dislodged therefrom.

By arranging the walls of chamber 38 and heads 39 as part of the discharge electrode system, the stream contents are led into a field having walls which form charged surfaces capable of giving the particles which may contact therewith a charge of the same sign as that of the discharge electrodes. As the path is so arranged that particles may contact with such surfaces at different times, such particles as may have had a charge of opposite sign and lose it during initial contact, will receive the desired charge on a second contact. Hence, at least a major portion of the particles will be initially ionized to bring into effect the repelling action of charges of like sign, tending to retain the discharge electrode clean and at the same time make the ionizing field immediately effective in carrying the particles to the stream boundary.

The successive actions on the stream contents thus permit of the use of ionization fields of short length, enable the use of high gas velocities, and provide for an increase in the scouring effect of the high speed gases.

Figure 16:
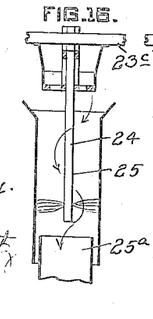
Figures 17, 18:
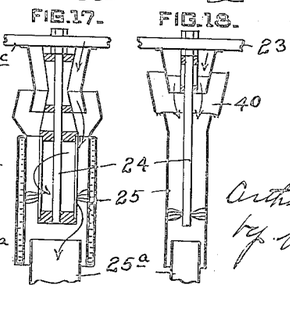
Fig. 18 is a further modification showing apparatus adapted to eliminate moisture.

The configuration of the head may vary. For instance, Figs. 13, 14 and 18 show converging of the outer wall of the contracted portion toward the exit, as in Figs. 11 and 12, the upper portion being varied in configuration. In Fig. 15, the opposite effect is produced by diverging the lower portion, the discharge electrode in this form being increased in diameter to produce the proper delivery of the gases. In Fig. 16, the lower portion is cylindrical.

Figs. 13–16 also distinguish from Fig. 11 in that the head does not extend into the upper end of the collecting electrode, the latter carrying flared portions of greater angle than that of Fig. 11. Fig. 17 has the head flared in opposite directions, with the collecting electrode flare extending above the plane of the bottom of the head; the discharge electrode is enlarged as in Fig. 15.

In these several forms, the collecting electrode flare is arranged to reduce the possibility of the streams of one field extending out into the supply for other fields, while at the same time, short circuiting of the apparatus is prevented through proper spacing of the electrode flare and the head.

The arrangement of Fig. 18 is more particularly adapted for use where the stream contents include moisture or liquid molecules, the centrifugal action set up tending to carry the liquid to the flare walls, the drippings passing into an annular trough 40 which may be provided with drain openings. This form may also be employed where the particles are such as will enable the centrifugal action to be effective in delivering the particles beyond the inlet end of the collecting electrode, a condition which may be present in some uses. When the character of the contents is such as will enable this partial separation under centrifugal action alone to take place, the work to be performed within the ionization field is correspondingly reduced.

Figures 19, 19A:
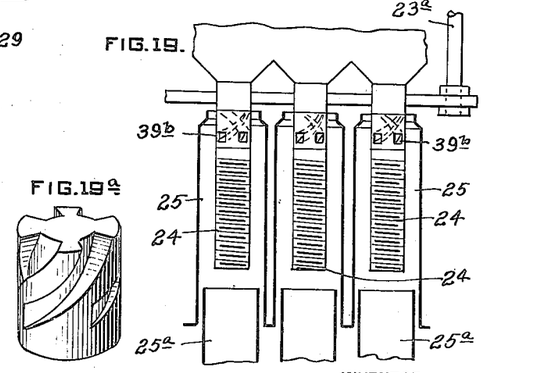
Fig. 19 is a diagrammatic view showing a still further modification.

Figs. 19 and 19ª show a modification in which the discharge electrodes may be tubular or have a tubular upper end, such end receiving the heads, the electrode having openings 39ᵇ with which the passageways of the head communicate. This places the head entirely within the electrode, an arrangement which causes the discharge of the streams to be below the top plane of the collecting electrode, thus permitting the omission of the collecting electrode flare. In fact, such arrangement may permit the upper ends of the collecting electrodes to be contracted, as shown in the drawings. The particular form of the head may vary, the form shown in Fig. 19ª indicating one way in which it is applicable for use.

In each of these forms, the gas entering the separating apparatus passes into the individual inlets of the head structures, thus forming general streams, each stream then passing into the vane portion of the head and thus subdivided into smaller streams, each of the latter discharging in a non-radial direction. As a result, the gas stream is materially changed in character and is brought into the ionization field with increased speed and in directions which will produce a whirling motion to the stream which becomes reunited within the ionization field. The gas enters the ionizing field while in such whirling condition, so that the ionizing action is augmented by the centrifugal effect which these movements of the gas provide. Obviously, this not only produces a scouring action due to the friction of the gases on the collecting wall, but the high velocity of the particles which are brought into contact with such walls also tend to set up a scouring action, the result being that the collecting electrode will be kept free from deposit to a more or less extent.

The specific direction of movement of the gases in this type of structures is more or less angular to the direction of gravity, but the general direction of gas flow is in accord with gravity, in that the gases traverse the fields from top to bottom. Hence, the scouring action always tends to move the collected particles toward the outlet end of the field even though the particles may be carried in a spiral path on to the collecting electrode.

These various forms of head structures are illustrative of the possibilities in this respect and are not intended to indicate structural limitations. Obviously, the structures may be composed of combinations of these head structures.

If desired, the collecting electrodes may be formed with a water jacket as indicated in Fig. 17.

In this type of devices, the discharge electrode may have a plurality of circular and parallel discharge edges or may have the form of a spiral edge or a plurality of such edges, thus tending to produce zones through which the gas streams pass.

What I claim is:—

1. The method of removing particles from fluid streams which consists in establishing a stream flow path, establishing an ionization field within said flow path to divert and collect particles in the stream on a stream boundary, conducting the collected particles along said boundary toward an end of the flow path, and increasing the length of the ionization discharge in a transverse plane adjacent to one end of the ionization field to thereby isolate the collected particles from the said flow path.

2. The method of removing particles from fluid streams which consists in establishing a stream flow path, establishing an ionization field within said flow path to divert and collect particles in the stream on a stream boundary, conducting the collected particles along said boundary toward an end of the flow path, and increasing the length of the ionization discharge in a transverse plane intermediate the ends of the flow path to separate and remove the collected particles from said flow path.

3. The method of removing particles from fluid streams which consists in separating a column of fluid into a plurality of streams and establishing flow paths for said streams, establishing an ionization field within each flow path to divert and collect particles in the streams on a stream boundary, conducting the collected particles along said boundaries toward an end of the stream flow paths, and increasing the length of the ionization discharge in a transverse plane adjacent to an end of the ionization fields to thereby isolate the collected particles from the stream flow paths.

4. The method of removing particles from fluid streams which consists in separating a column of fluid into a plurality of streams and establishing flow paths for said streams, establishing an ionization field within each flow path to divert and collect particles in the streams on the stream boundaries, conducting the collected particles along said boundaries toward an end of the flow paths, increasing the length of the ionization discharge in a transverse plane adjacent to an end of the ionization fields to isolate the collected particles from the stream flow paths, and then consolidating the separately ionized streams.

5. The method of removing particles from fluid streams which consists in establishing a stream flow path, establishing an ionization field within said flow path to divert particles in the stream and collect them on a stream boundary, conducting the collected particles along said boundary toward an end of the stream flow path, and increasing the length of the ionization discharge in a transverse plane adjacent to one end of the ionization field to isolate the collected particles from the fluid stream, changing the direction of flow in the stream flow path and expanding the stream at the point of change in direction to cause the removal of particles remaining in the stream of treated fluids.

6. The method of removing particles from fluid streams which consists in separating a column of fluid into a plurality of streams and establishing stream flow paths for said streams, establishing an ionization field within each flow path to divert and collect particles in the streams on the stream boundaries, conducting the collected particles along said boundaries toward an end of the flow paths, increasing the length of the ionization discharge in a transverse plane adjacent to an end of the ionization fields to isolate the collected particles from the streams, changing the direction of flow in the stream flow paths and expanding the streams at the point of change in direction of flow to cause the removal of particles remaining in the streams.

7. The method of removing particles from fluid streams which consists in establishing a spiral stream flow path, establishing an ionization field within said flow path to divert particles in the stream and collect them on a stream boundary, conducting the collected particles along said boundary toward an end of the stream flow path and increasing the length of the ionization discharge in a transverse plane adjacent to one end of the ionization field to remove the collected particles from the stream flow path, and segregate the removed particles.

8. The method of removing particles from fluid streams which consists in separating a column of fluid into a plurality of streams, establishing a spiral stream flow path for said streams, establishing an ionization field within each flow path to divert and collect particles in the streams on the stream boundaries, conducting the collected particles along said boundaries toward an end of the stream flow paths, increasing the length of the ionization discharge in a transverse plane adjacent to an end of the ionization field to separate and remove the collected particles from the fluid streams, and then segregating the removed particles.

9. The method of removing particles from fluid streams which consists in ionizing the stream contents and introducing the stream while still ionized into another ionization field with a whirling motion and passing the whirling stream through said ionization field, in collecting and separating the particles from the stream.

10. The method of removing particles from fluid streams which consists in ionizing the particles in the stream with a charge sign similar to the sign of the discharge electrode of an ionization field, introducing the stream contents while still ionized into and through said field with a whirling motion and passing the whirling stream through the ionization field in collecting and removing the particles from the stream.

11. The method of removing particles from fluid streams which consists in establishing a flow path for the stream with a portion of such path in the form of an ionization field, sub-dividing the stream into smaller streams in such flow path and in advance of the entrance of the stream into the field, and shifting the direction of flow of each sub-divided stream to produce discharge of the individual streams into the field in directions to effect spiral travel of the stream within the field.

12. The method of removing particles from fluid streams which consists in establishing a flow path for the stream with a portion of such path in the form of an ionization field, sub-dividing the stream into smaller streams in such flow path and in advance of the entrance of the stream into the field, shifting the direction of flow of the stream while in such individual stream form, and bringing the streams into a composite stream for travel through the field after such shifting has been completed, whereby the direction of flow of the composite stream will be determined by the individual stream shifting action.

13. Apparatus for removing particles from fluid streams comprising opposing electrode systems including a collecting electrode structure, said systems being adapted to produce an ionization field for diverting particles from the stream and collecting them in proximity to the collecting electrode, an element insertible within the exit end of the collecting electrode structure of a field to provide an outlet for collected particles independent of the stream.

14. Apparatus for removing particles from fluid streams comprising opposing electrode systems including a collecting electrode structure, said systems being adapted to produce an ionization field for diverting particles from the stream and collecting them in proximity to the collecting electrode, an element insertible within the exit end of the collecting electrode structure of a field to provide an outlet for collected particles independent of the stream, and a deposit chamber in communication with such outlet.

15. Apparatus for removing particles from fluid streams comprising opposing electrode systems having a discharge electrode and a tubular collecting electrode, said electrode systems being adapted to form an ionization field therebetween for diverting and collecting particles in said stream in proximity to said collecting electrode, means adjacent to the inlet end of said ionization field for imparting a whirling motion to the entering stream contents, and means adjacent to the exit end of the ionization field for trapping and isolating the collected particles from the fluid stream.

16. Apparatus for removing particles from fluid streams comprising a plurality of separate and independently operating electrode systems, said systems having discharge electrodes and tubular collecting electrodes, means for conducting a column of fluid to said electrode systems, said systems being adapted to form ionization fields between the discharge and collecting electrodes for diverting and collecting in proximity to the collecting electrodes, the particles in the fluid passing through said fields, means adjacent to the inlet end of each tubular electrode for imparting a whirling motion to the entering stream contents, and means adjacent to the exit end of the tubular electrodes for trapping and isolating the trapped particles from the fluid streams.

17. Apparatus for removing particles from fluid streams comprising a plurality of separate and independently operating electrode systems, said systems having discharge and tubular collecting electrodes, means for conducting a column of fluid to said electrode systems, said systems being adapted to form ionization fields between the discharge and collecting electrodes for diverting and collecting in proximity to the collecting electrodes, the particles in the fluid passing through said fields, means adjacent to the inlet end of each tubular electrode for imparting a whirling motion to the entering stream contents, and means adjacent to the exit end of the tubular electrodes for trapping and isolating the trapped particles from the fluid contents, and means at the exit end of said tubular electrodes for consolidating the streams of fluid emerging from the tubular electrodes.

18. Apparatus for removing particles from fluid streams comprising means for producing an ionization field, and a stream direction-controlling element at the entrance to the field operative to divide the stream into smaller streams and control the direction of flow of the individual streams into the field.

19. Apparatus for removing particles from fluid streams comprising means for producing an ionization field, and a stream direction-controlling element at the entrance to the field operative to divide the stream into smaller streams and control the direction of flow of the individual streams into the field, said element having a plurality of vanes curved in the direction of stream flow.

20. Apparatus for removing particles from fluid streams comprising opposing electrode systems having a discharge electrode and a tubular collecting electrode, said electrode systems being adapted to form an ionization field therebetween for diverting and collecting particles in said stream in proximity to said collecting electrode, means adjacent to the inlet end of said ionization field for ionizing the stream contents preliminary to the entrance of the ionized stream into said field, and means adjacent to the exit end of the ionization field for trapping and isolating the collected particles from the fluid stream.

21. Apparatus for removing particles from fluid streams comprising a plurality of separate and independently operating electrode systems, said systems having discharge electrodes and tubular collecting electrodes, means for conducting a column of fluid to said electrode systems, said systems being adapted to form ionization fields between the discharge and collecting electrodes for diverting and collecting in proximity to the collecting electrodes, the particles in the fluid passing through said fields, means adjacent to the inlet end of said ionization fields for ionizing the stream contents preparatory to the entrance thereof into said ionization fields, and means adjacent to the exit end of the tubular electrodes for trapping and isolating the trapped particles from the fluid streams.

22. Apparatus for removing particles from fluid streams comprising a plurality of separate and independently operating electrode systems, said systems having discharge electrodes and tubular collecting electrodes, means for conducting a column of fluid to said electrode systems, said systems being adapted to form ionization fields between the discharge and collecting electrodes for diverting and collecting in proximity to the collecting electrodes, the particles in the fluid passing through said fields, means adjacent to the inlet end of said ionization fields for ionizing the stream contents preparatory to the entrance thereof into said ionization fields, means adjacent to the exit end of the tubular electrodes for trapping and isolating the trapped particles from the fluid streams, and means at the exit end of said tubular electrodes for consolidating the emerging streams.

In testimony whereof I affix my signature in presence of two witnesses.

ARTHUR F. NESBIT.

Witnesses:
W. G. DOOLITTLE,
ABIE B. DICE.